(12) United States Patent
Lejgren

(10) Patent No.: US 6,260,216 B1
(45) Date of Patent: Jul. 17, 2001

(54) COMPOSTING TOILET

(76) Inventor: Harry Lejgren, Fjordvägen 18, SE-436 50, Hovås (SE)

( * ) Notice: Subject to any disclaimer, the term of this patent is extended or adjusted under 35 U.S.C. 154(b) by 0 days.

(21) Appl. No.: 09/601,861
(22) PCT Filed: Feb. 3, 1999
(86) PCT No.: PCT/SE99/00138
§ 371 Date: Aug. 4, 2000
§ 102(e) Date: Aug. 4, 2000

(51) Int. Cl.[7] .................................................. A47K 11/02
(52) U.S. Cl. ........................................... 4/449; 4/DIG. 12
(58) Field of Search ................... 4/449, DIG. 12; 435/290.1–290.4

(56) References Cited

U.S. PATENT DOCUMENTS

| | | | |
|---|---|---|---|
| 3,859,672 | * 1/1975 | Modig | 4/DIG. 12 X |
| 4,096,592 | 6/1978 | Clark | 4/111 |
| 4,313,234 | * 2/1982 | Stewart | 4/DIG. 12 X |
| 4,521,304 | 6/1985 | Yount | 210/96.1 |
| 5,345,620 | * 9/1994 | Sundberg | 4/449 |

FOREIGN PATENT DOCUMENTS

| | | | |
|---|---|---|---|
| 1444244 | 7/1976 | (GB) | A47K/11/02 |
| 131228 | 1/1975 | (NO) | A47K/111/00 |

* cited by examiner

*Primary Examiner*—Charles E. Phillips

(57) ABSTRACT

A composting toilet for composting toilet waste, which toilet comprises a composting chamber, in which the toilet waste is received and when needed is mixed with a decomposition-boosting material in order to decompose this compost into humus, a humus-collection box, which is located underneath the composting chamber for collection and emptying of the humus from the composting chamber, and a grid positioned between the composting chamber and the humus-collection box and formed with through-passage openings, said grid arranged to support the compost and to allow fall-through of the humus from the composting chamber to the humus-collection box. Underneath the grid a sliding damper is arranged for regulation of the degree of openness of the openings in the grid and of the fall-through of the humus in order thus to control the decomposition process in the composting chamber by regulation of the moisture balance in the compost contained in the composting chamber.

7 Claims, 2 Drawing Sheets

COMPOSTING TOILET

TECHNICAL FIELD

Figure 1:
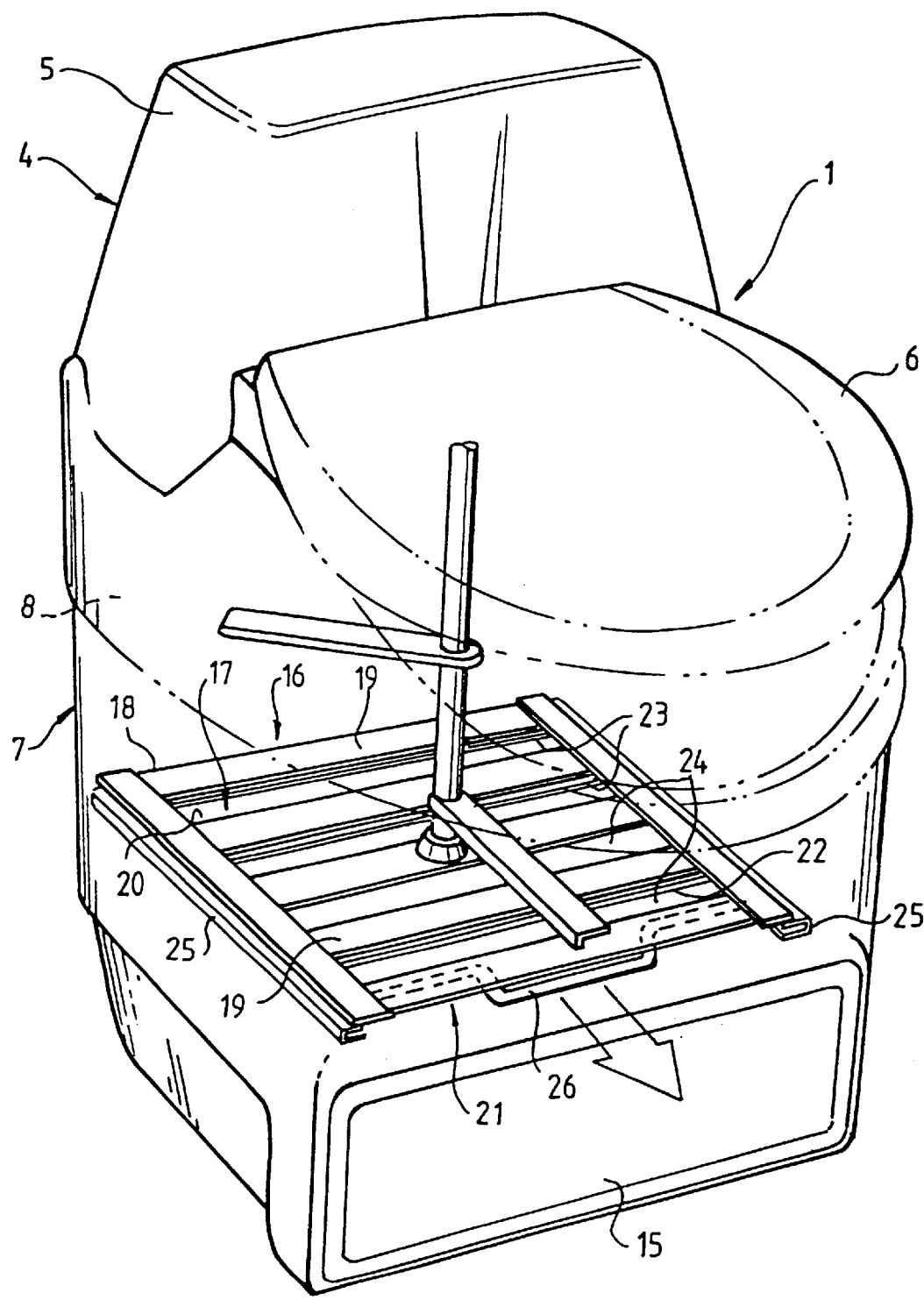

The present invention relates to improvements in a biological toilet or composting toilet for composting toilet waste, which toilet comprises a composting chamber, in which the toilet waste is received and when needed is mixed with a decomposition-boosting material in order to decompose this compost into humus, as well as a container, which is located underneath the composting chamber for collection and employing of the humus progressively forming in the composting chamber, and also a support, which is formed with perforations and which is located between the composting chamber and the humus-collection container to support the compost and the allow fall-through of humus from the composting chamber to the humus-collection container.

BACKGROUND OF THE INVENTION

In a composting toilet the toilet waste, i.e. urine, faeces, and toilet paper, is composted into humus with the aid of biological microorganisms and evaporation of liquids. To accelerate the decomposition process, controlled supply of heat and air and stirring of the compost at regular intervals may be resorted to.

For various reasons, primarily the frequency of use of the composting toilet, the times of use and the number of users, the compost often tends to be either too moist or too dry. In both cases, the decomposition process is decelerated and may even stop completely. The compost is too moist when it is no longer able to absorb liquid; the liquid remains on top of the compost and slowly seeps into the humus-collection container. As a result, the humus-collection container risks being filled with liquid and liquid may even spill over, which may result in damage due to damp and cause bad odours. Reversely, the compost is too dry, when lumps form or when toilet paper remains on top and is not soaked-through or mixed with the rest of the material upon stirring. The composting or decomposition process can then be slowed down or stop completely. If this happens, liquid must be supplied, for example by water being sprayed thereon one or several times until the compost becomes sufficiently moist for the decompostion process to proceed as intended.

OBJECT OF THE INVENTION

The object of the invention is to provide a unique solution to the problem of maintaining the moisture content or moisture balance of the compost as constant as possible and at an optimum value.

SUMMARY OF THE INVENTION

This object is achieved in a way, which is as ingenious as it is simple, by providing adjacent the support a regulating means, which regulates the degree of openness of the perforations in the support and the passage-through of the humus in order thus to control the decomposition in the composting chamber by regulation of the moisture balance in the compost contained in the composting chamber.

The support preferably is configured as an essentially flat grid while at the same time the regulating means may be configured as an essentially flat sliding damper, which is arranged for sliding translatory motion essentially in parallel with the grid.

The grid as well as the sliding damper are formed with bars and elongate openings, preferably arranged in alternate positions, said bars and openings extending transversely across a lower outlet opening in the composting chamber and arranged to cooperate in order to completely or partly expose and obstruct the grid openings.

BRIEF DESCRIPTION OF THE DRAWING FIGURES

Figure 2:
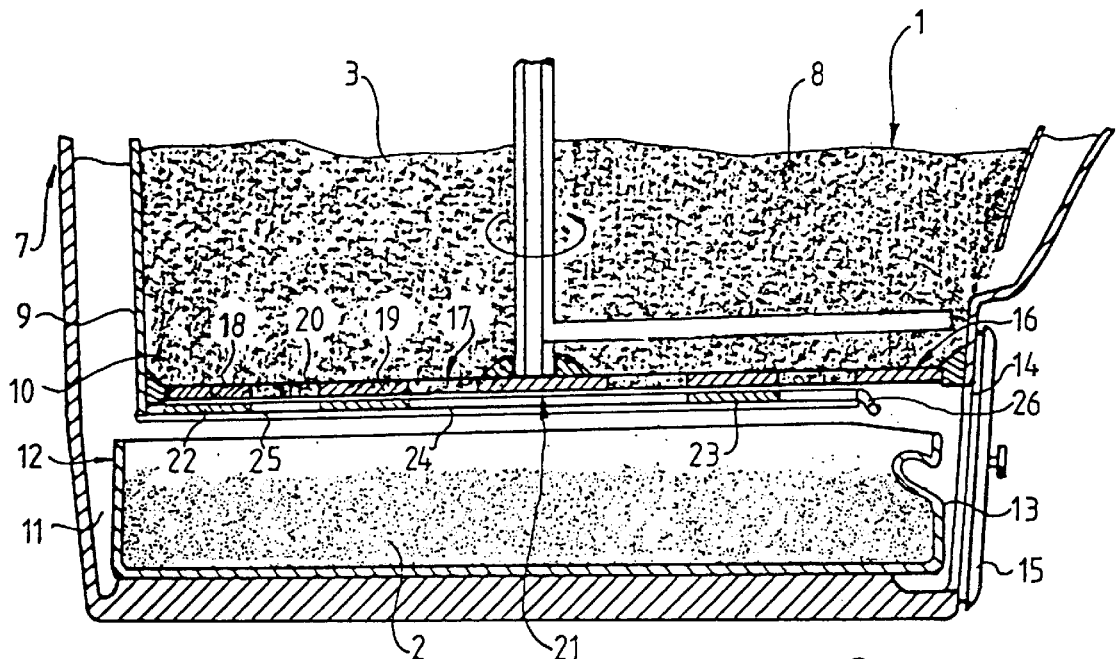
Figure 3:
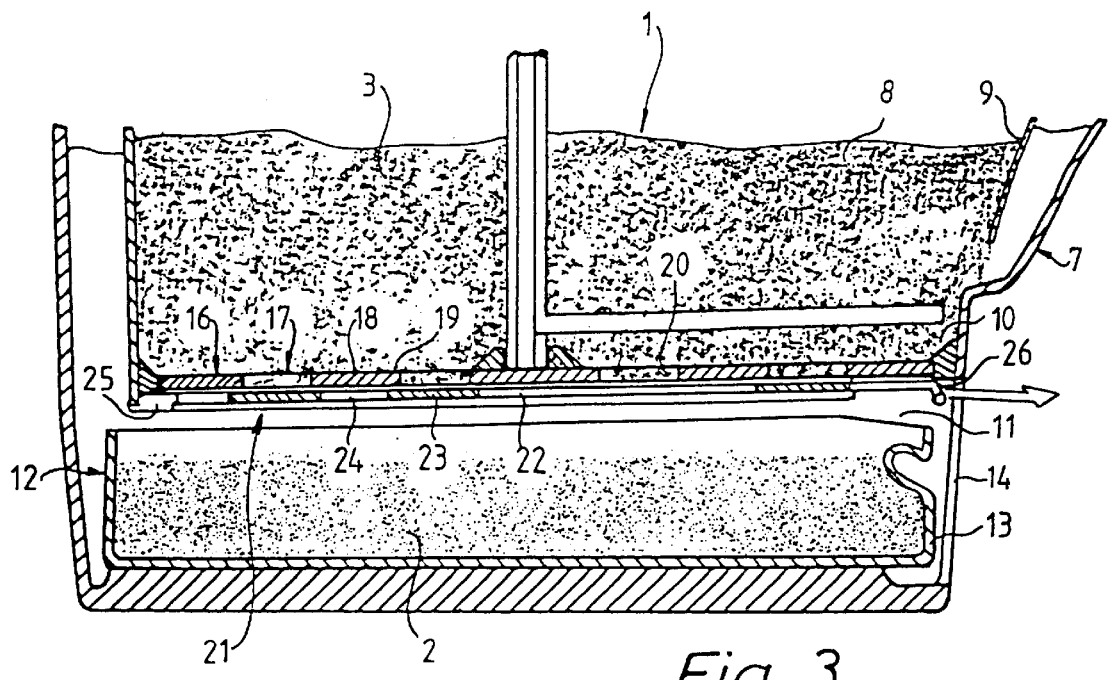

The invention will be described in more detail in the following with reference to the accompanying drawings, wherein FIG. 1 is a perspective view as seen obliquely from the front, illustrating the outline of a composting toilet and, in full lines, a presently preferred embodiment of the device in accordance with the invention, and FIGS. 2 and 3 are median sectional views of the lower part of the composting toilet of FIG. 1, illustrating a regulating means incorporated in the device of the invention in two different operative positions.

DESCRIPTION OF A PREFERRED EMBODIMENT

The object of the biological toilet or composting toilet, designated generally in the drawing figures by numeral 1, is as already mentioned to compost toilet waste into humus 2 with the aid of microorganisms naturally present in nature and by means of evaporation of liquid, and the decomposition process is accelerated by controlled supply of heat and air and stirring at regular intervals of the compost 3, the latter consisting of toilet waste and a decomposition-boosting substance.

The composting toilet 1 comprises a casing of impact resisting plastics or the like. The casing comprises a top portion 4 including a cover 5, which may house inter alia a unit including a fan motor and heating elements in order to circulate and heat air for the purpose of accelerating composting process, and an assembly 6 comprising a lid and an annular seat. In addition, the casing comprises a bottom portion 7, which is connected to the top portion 4 in any suitable manner, not shown in detail.

The bottom portion houses a composting chamber 8, which is defined by a peripheral wall 9 and which has an open top and bottom. At its upper part, the composting chamber 8 is formed with an inlet opening, not shown, for reception of the toilet waste, and its lower part with a lower outlet opening 10 to be described in more detail in the following. In the composting chamber 8 the toilet waste may, if needed, by admixed with a decomposition-boosting material, for example humus having a composition particularly formulated for this purpose, compost 3 already present in the composting chamber, litter, any suitable liquid or solid environmentally friendly preparation, etcetera, to ensure transformation into humus 2 of the compost 3 thus obtained.

Underneath the composting chamber 8, in a space 11 in the bottom portion 7, see FIGS. 2 and 3, there is arranged a humus-collection chamber 12, for collection and emptying of the humus 2 that progressively forms in the composting chamber 8. In accordance with the shown embodiment, the humus-collection container is configured as an open-top box 13 of plastics or some other suitable material. To withdraw humus 2 from the box 13 the latter may be pulled out of the space 11 via an opening 14 formed in the bottom portion 7 of the composting toilet 1. The opening 14 is in turn arranged to be exposed and be closed by means of a lid 15, which may be applied and removed from the exterior.

As appears from FIGS. 2 and 3 a support 16 is provided between the composting chamber 8 and the humus-collection container 12/box 13, in which support through passages or perforations 17 have been formed and which serves to support the compost 3 inside the composting chamber 8 and to allow the formed humus 2 to pass from the latter chamber into the humus-containing box 13. As illustrated, the support 16 is located adjacent the lower outlet opening 10 of the composting chamber 8, and covers said opening.

The support 16 as illustrated herein is configured as an essentially flat grid 18 of a suitable metal, preferably stainless steel. The grid 18 consists of alternate elongate bars 19 and elongate openings 20 formed by the perforations 17 extending across the lower outlet opening 10 of the composting chamber 8. The number of bars 19 and openings 20 is chosen in this case to five and four, respectively, but this number may be modified according to wish and need.

Adjacent to the support 16 formed by the grid 18 a regulating means, generally designated by numeral 21, may be provided. The means serves to regulate the degree of openness of the openings 20 in the grid and allow passage-through of the formed humus 2. In this manner, the decomposition process inside the composting chamber 8 is controlled by optimum regulation of the moisture contents or moisture balance in the compost 3 inside the composting chamber 8.

As clearly appears from FIGS. 2 and 3, the regulating means 21 is located between the box 13 forming the humus-collection container 12 and the grid 18, and more precisely, the regulating means is configured, in accordance with the preferred embodiment, as an essentially flat sliding damper, which like the grid 18 advantageously is made from metal, preferably stainless steel. The damper 22 is arranged to be slid in a lengthwise translatory motion essentially in parallel with the grid 18, and like the latter it is provided with alternate elongate bars 23 and elongate openings 24. The bars 23 and openings 24 of the damper 22 cooperate with the bars 19 and openings 20 of the grid 18 in order to completely or partly obstruct and expose the openings 20 of the grid 18.

In order to achieve such cooperation, the damper 22 is guided for sliding motion in elongate lateral guides 25 secured in the composting chamber 8 in such a manner that the damper 22 constantly will be located immediately below the lower face of the grid 18 and alternatively even so as to abut against said lower grid face. The damper 22 preferably is operable manually by means of a handle 26, which is attached thereto for that purpose and which may be accessible from without via the access opening 14 to the space 11 containing the humus-collection box 13, cf. FIGS. 2 and 3.

It should be appreciated that the invention must not be considered limited to the embodiment described above and illustrated in the drawings but that it may be modified in a variety of ways within the scope of the claimed protection. For example, the support 16 and the regulating means 21 could be configured otherwise than as a grid 18 and a damper 22, for example as a variable aperture or a butterfly valve, etcetera. Instead of the handle 26, the operation of the regulating means 21/damper 22 may be effected by means of e.g. a motor and/or a thermal control or by any other suitable means.

What is claimed is:

1. An improved composting toilet (1) for composting toilet waste, which toilet comprises a composting chamber (8), in which the toilet waste is received and when needed is mixed with a decomposition-boosting material in order to decompose this compost (3) into humus (2), as well as a container (12), which is located underneath the composting chamber (8) for collection and emptying of the humus (2) progressively forming in the composting chamber, and also a support (16), which is formed with perforations (17) and which is located between the composting chamber (8) and the humus-collection container (12) to support the compost (3) and to allow fall-through of humus (2) from the composting chamber to the humus-collection container, said composting chamber (8) having a lower outlet opening (10) and said support (16) being located in the area of the lower opening (10), a regulating means (21) being positioned between the humus-collection container (12) and the support (16) for regulation of the degree of openness of the perforations (17) in the support and of the passage-through of the humus (2), characterised in that the support (16) is configured as an essentially flat grid (18) having alternating bars (19) and elongate openings (20) forming said perforations (17), said bars and openings extending across the lower outlet opening (10) of said composting chamber (8), and in that the regulating means (21) is configured as an essentially flat sliding damper (22) arranged for sliding lengthwise translatory motion essentially in parallel with the grid (18) and is formed with alternate bars (23) and elongate openings (24), said bars and openings cooperating with the bars (19) and the elongate openings (20) of the grid (18) in order to completely or partly expose and obstruct the grid openings, in order thus to control the decomposition process in the composting chamber (8) by regulation of the moisture balance in the compost (3) contained in the composting chamber.

2. An improved toilet as claimed in claim 1, characterised in that the sliding damper (22) is guided for sliding motion in guides (25) and suspended in the composting chamber (8) immediately below the grid (18).

3. An improved toilet as claimed in claim 2, characterized in that the humus-collection container (12) is configured as an open top box (13) arranged to be extractable out of the composting toilet (1) via an opening (14) formed in the toilet base (7) to allow emptying of the container contents.

4. An improved toilet as claimed in claim 2, characterized in that the damper (22) is operable manually by means of a handle (26), which is accessible from without via the opening (14) in the base (7) of the composting toilet (1).

5. An improved toilet as claimed in claim 1, characterised in that the humus-collection container (12) is configured as an open top box (13) arranged to be extractable out of the composting toilet (1) via an opening (14) formed in the toilet base (7) to allow emptying of the container contents.

6. An improved toilet as claimed in claim 5, characterized in that the damper (22) is operable manually by means of a handle (26), which is accessible from without via the opening (14) in the base (7) of the composting toilet (1).

7. An improved toilet as claimed in claim 1, characterised in that the damper (22) is operable manually by means of a handle (26), which is accessible from without via the opening (14) in the base (7) of the composting toilet (1).

* * * * *

UNITED STATES PATENT AND TRADEMARK OFFICE
CERTIFICATE OF CORRECTION

PATENT NO. : 6,260,216 B1
DATED : July 17, 2001
INVENTOR(S) : Harry Lejgren

It is certified that error appears in the above-identified patent and that said Letters Patent is hereby corrected as shown below:

<u>Title page,</u>
Insert -- Item [30] Foreign Application Priority Data
Feb. 5, 1998    Sweden ..................... 9800320-5 --.

Signed and Sealed this

Thirtieth Day of July, 2002

Attest:

Attesting Officer

JAMES E. ROGAN
*Director of the United States Patent and Trademark Office*